United States Patent
Albohr et al.

(10) Patent No.: US 8,024,965 B2
(45) Date of Patent: Sep. 27, 2011

(54) METHOD FOR ANALYSING TIRE VIBRATION CHARACTERISTICS AND AN APPARATUS FOR CARRYING OUT SAID METHOD

(75) Inventors: Oliver Albohr, Höchst (DE); Luciano Garro, Ornago (IT); Jörg Kumpf, Höchst (DE); Marcus-André Reul, Nauheim (DE); Bernd Sattler, Reichelsheim (DE); Joachim Schnellbächer, Fischbachtal (DE); Hermann Winner, Bietigheim (DE)

(73) Assignee: Pirelli Tyre S.p.A., Milan (IT)

( * ) Notice: Subject to any disclaimer, the term of this patent is extended or adjusted under 35 U.S.C. 154(b) by 0 days.

(21) Appl. No.: 12/309,639

(22) PCT Filed: Jul. 26, 2007

(86) PCT No.: PCT/EP2007/057714
§ 371 (c)(1),
(2), (4) Date: Jun. 25, 2009

(87) PCT Pub. No.: WO2008/012345
PCT Pub. Date: Jan. 31, 2008

(65) Prior Publication Data
US 2011/0056283 A9   Mar. 10, 2011

(30) Foreign Application Priority Data

Jul. 27, 2006   (EP) .................................. 06118017

(51) Int. Cl.
*B60C 23/02* (2006.01)
(52) U.S. Cl. ...................................................... 73/146.5
(58) Field of Classification Search ........................ None
See application file for complete search history.

(56) References Cited

U.S. PATENT DOCUMENTS

| | | | |
|---|---|---|---|
| 2,378,237 A | 6/1945 | Morris | |
| 3,604,249 A | 9/1971 | Wilson | |
| 3,815,407 A | 6/1974 | Lavery | |
| 3,871,210 A | 3/1975 | Himmler et al. | |
| 6,381,547 B1 | 4/2002 | Heirtzler et al. | |

FOREIGN PATENT DOCUMENTS

| | | |
|---|---|---|
| DE | 2 244 630 | 9/1972 |
| EP | 0 775 902 A1 | 5/1997 |
| EP | 0 775 904 A1 | 5/1997 |
| KR | 2003-0043366 | 6/2003 |

*Primary Examiner* — Andre Allen
(74) *Attorney, Agent, or Firm* — Finnegan, Henderson, Farabow, Garrett & Dunner, LLP

(57) ABSTRACT

A method for analyzing tire vibration characteristics and an apparatus for carrying out the method, wherein the apparatus includes a stiff frame including a wheel support for supporting a wheel with a tire to be analyzed. A base part is flexibly connected with the frame by elastic means. The elastic means is embodied such that the frame is flexibly supported in one predefined functional direction. An actuator is provided for exciting vibrations into the wheel. The method and apparatus allow separate analysis of the natural vibrations in all four functional directions.

17 Claims, 3 Drawing Sheets

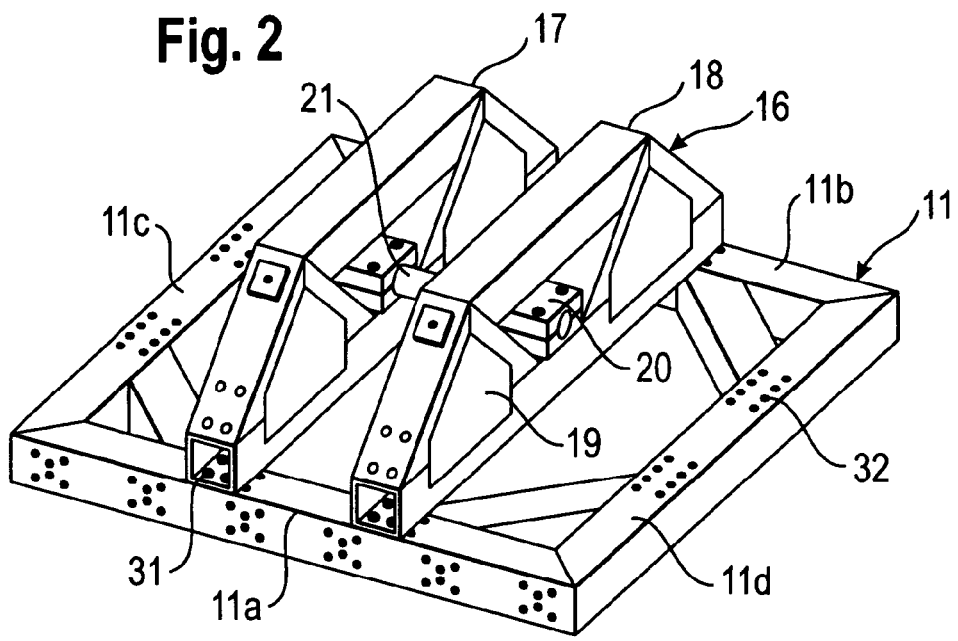
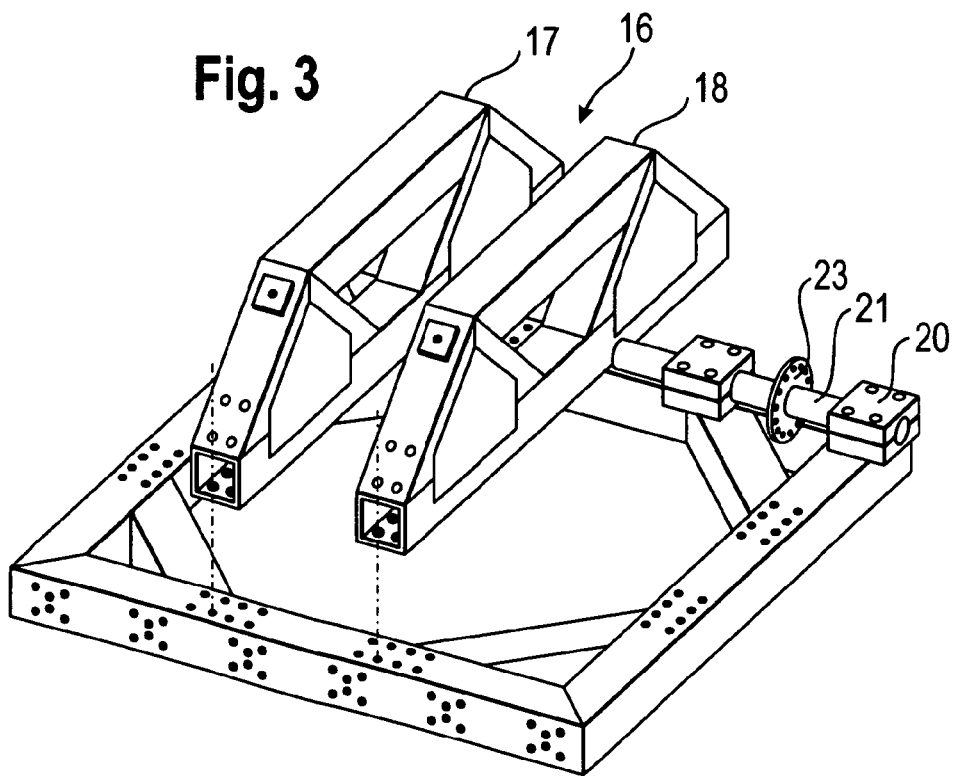

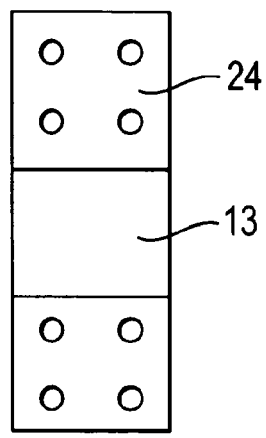
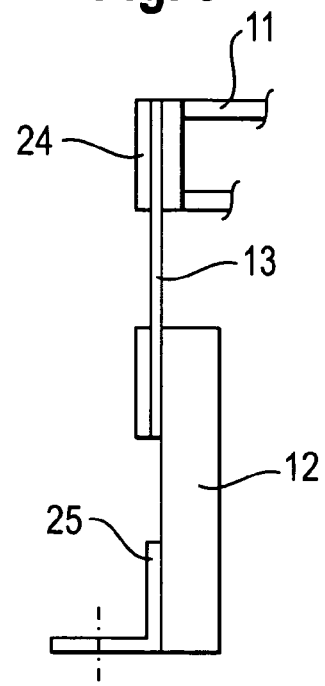
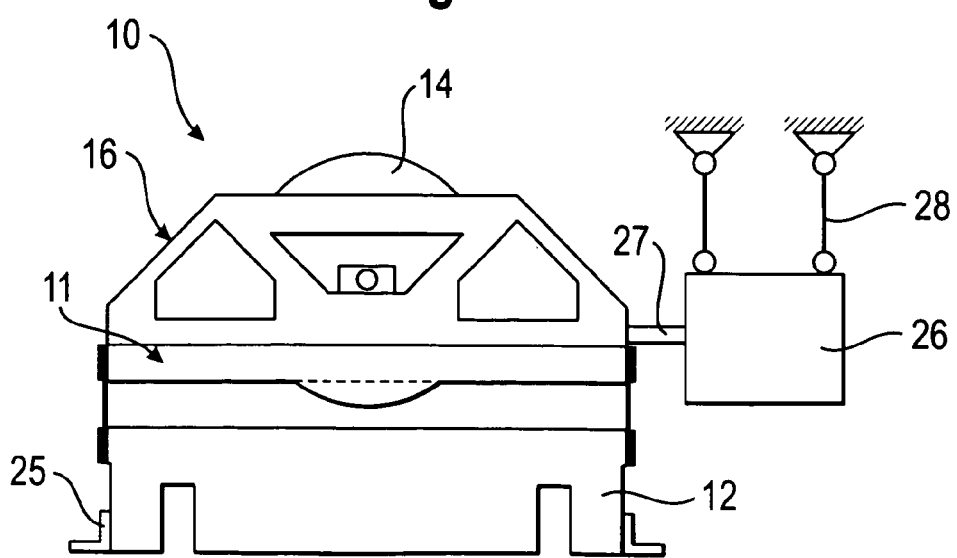

METHOD FOR ANALYSING TIRE VIBRATION CHARACTERISTICS AND AN APPARATUS FOR CARRYING OUT SAID METHOD

CROSS REFERENCE TO RELATED APPLICATIONS

This application is a national phase application based on PCT/EP2007/057714, filed Jul. 26, 2007, and claims the priority of European Patent Application No. 06118017.0, filed Jul. 27, 2006, the content of both of which is incorporated herein by reference.

BACKGROUND OF THE INVENTION

1. Field of the Invention

The invention relates to a method for analysing tire vibration characteristics and an apparatus for carrying out said method.

2. Description of the Related Art

The tyre is the element through which the road and the vehicle exchange forces. If the structure of the tire is rigid, forces are transmitted directly, without any attenuation. If the structure is elastic the forces transmitted can be attenuated, or on the other hand amplified, due to resonances. The tire is a viscoelastic body and, like all viscoelastic bodies, it vibrates when it is excited (by forces or by deformations). It is therefore possible to say that the vibrations felt by the passengers inside the vehicle are influenced or generated by the tire.

Today, development of a tire for a vehicle model is made in accordance with detailed specifications of car manufacturers. During development specific changes with respect to the construction and the materials used have to be made in order to influence the performance of the vehicle. A specific change of tire parameters helps to save development time and costs. In this connection the analysis of the vibration characteristics, in particular the natural vibrations of tires, is important. Nowadays, this analysis is carried out using testing benches.

In known testing benches comprising a wheel support for supporting a wheel with a tire to be analysed the excitation of vibrations is made via the tire surface. In this case a superposition of free tire vibrations with friction effects cannot be excluded.

In another known testing bench as disclosed in KR-A 1020030043366 the introduction of vibrations is made via an element which is arranged in the surface of the tire with positive locking. A vibrator having a stinger at an upper end thereof is mounted on a lower plate of a supporting frame. A wheel with a tire fitted thereon is suspended from levers which transfer vibrations to an accelerometer arranged at the upper plate of the supporting frame. Since the introduction of vibrations is made via the surface of the tire, modulations can occur due to local bending stress.

EP-B1 0 775 902 and 0 775 904 disclose a torsional vibrator capable of torsionally exciting a tire of a wheel and providing measurements of angular vibrations. The wheel with the tire fitted thereon is fastened on a driving shaft of the vibrator. Two acceleration transducers are fastened to the rim in a diametrically opposite position. Two further acceleration transducers are fastened to the tire by means of a clamp fastened to the tire surface. In operation the driving shaft performs angular oscillations and torsionally excites the wheel that thus vibrates in a rotational direction. The accelerometers detect rotational vibrations and provide measurements of angular acceleration of the wheel and of the tire. This known apparatus only permits analysis in one functional direction i.e. rotational vibrations.

SUMMARY OF THE INVENTION

The object of the present invention is a method for non-destructive analysis of natural vibrations of tires and an apparatus for carrying out said method that allows separate analysis of the natural vibrations in all four functional directions i.e. longitudinal vibrations, lateral vibrations, radial vibrations and rotational vibrations.

The above mentioned object is achieved, according to the invention, with a method of non-destructive analysis of natural vibrations of tires comprising the steps:
fitting a tire to be analysed on a wheel;
arranging said wheel in an apparatus comprising a wheel support supporting said wheel flexibly in a predefined functional direction;
excitation of vibrations in said wheel by means of an actuator;
measuring an input signal x(t) at a contact surface between said tire and said wheel;
measuring an output signal y(t) at a surface of said tire;
calculating transfer function of tire $H_{tire}$ by means of the input signal x(t) and the output signal y(t).

In the method of non-destructive analysis of natural vibrations of tires according to the invention the influencing variables of the natural vibrations of the tire are separated. This is achieved by supporting the wheel and the tire fitted thereon such that the motion is guided in one predefined direction of interest. Since excitation is made via the wheel, no superposition due to friction effects or modulation due to bending stress occurs.

According to a one preferred embodiment, said method is carried out with and without load on said tire.

According to a further embodiment, said excitation is introduced in the center of gravity of said wheel.

According to still a further aspect, said output signal y(t) is formed by the vibration of the complete tire structure of the tire surface.

Furthermore, the above-mentioned object is solved by an apparatus for carrying out said method comprising:
a stiff frame including a wheel support for supporting a wheel with a tire to be analysed;
a base part flexibly connected with said frame by elastic means;
said elastic means is embodied such that the frame is flexibly supported in one predefined functional direction; and
an actuator for exciting vibrations into said wheel.

With the apparatus according to the invention analysis of the natural vibrations in all four functional directions i.e. longitudinal vibrations, lateral vibrations, radial vibrations and rotational vibrations can be carried out. Superposition effected by friction effects and modulation effected by local bending stress is avoided since excitation is made via the wheel on which the tire is fitted. Furthermore, the influencing variables of the natural vibrations of the tire are separated since the frame is flexibly supported in one predefined direction by elastic means. The apparatus according to the invention provides a modular design. Thus, the apparatus can be used for the analysis of a broad range of tires.

According to one preferred embodiment, said elastic means is comprised of a plurality of leaf springs distanced apart from each other.

According to one preferred embodiment, the stiffness of said leaf springs is dimensioned such that the frequency of resonance in the direction of excitation lies below the desired frequency of excitation of said tire.

According to one further embodiment, the stiffness of said frame and of said leaf springs in the transverse direction is dimensioned such that the frequency of resonance is above the desired frequency of excitation of said tire.

According to a further embodiment, said frame consists of welded aluminium wrought products.

According to a further embodiment, said wheel support comprises two supporting members distanced apart from each other, said supporting members supporting a shaft for mounting said wheel.

According to a further preferred embodiment, a wheel adaptor is connected with said shaft.

The wheel support is advantageously adjustable with respect to said frame. Thus, the apparatus can be easily adapted to the size of the tire.

In one further preferred embodiment, said shaft is supported in clamping jaws arranged at the end of said shaft.

In a further preferred embodiment, said wheel support comprises at least one thrust member for taking up thrust forces.

Said actuator advantageously can be a hydraulic, electrodynamic, electromagnetic or a piezoelectric actuator.

According to a further preferred embodiment, said actuator is an electrodynamic shaker comprising a stinger connected with said frame.

In a further preferred embodiment, said actuator for introducing rotational vibrations is comprised of at least one shaker which is connected with a lever fastened to said shaft.

In a preferred embodiment, said actuator is elastically suspended.

BRIEF DESCRIPTION OF THE DRAWINGS

Features and advantages of the present invention will now be illustrated with reference to an embodiment represented schematically in the enclosed drawings, wherein:

FIG. 2 is a three-dimensional view of the frame including the wheel support of the apparatus of FIG. 1;

FIG. 3 is a three-dimensional exploded view of the frame including the wheel support of the apparatus of FIG. 1;

FIG. 4 is a front view of a leaf spring of the apparatus according to FIG. 1;

FIG. 5 is partial side view of the frame and the base part of the apparatus of FIG. 1; and FIG. 6 is a side view of the apparatus of FIG. 1 in connection with an actuator.

DETAILED DESCRIPTION OF THE INVENTION

Figure 1:
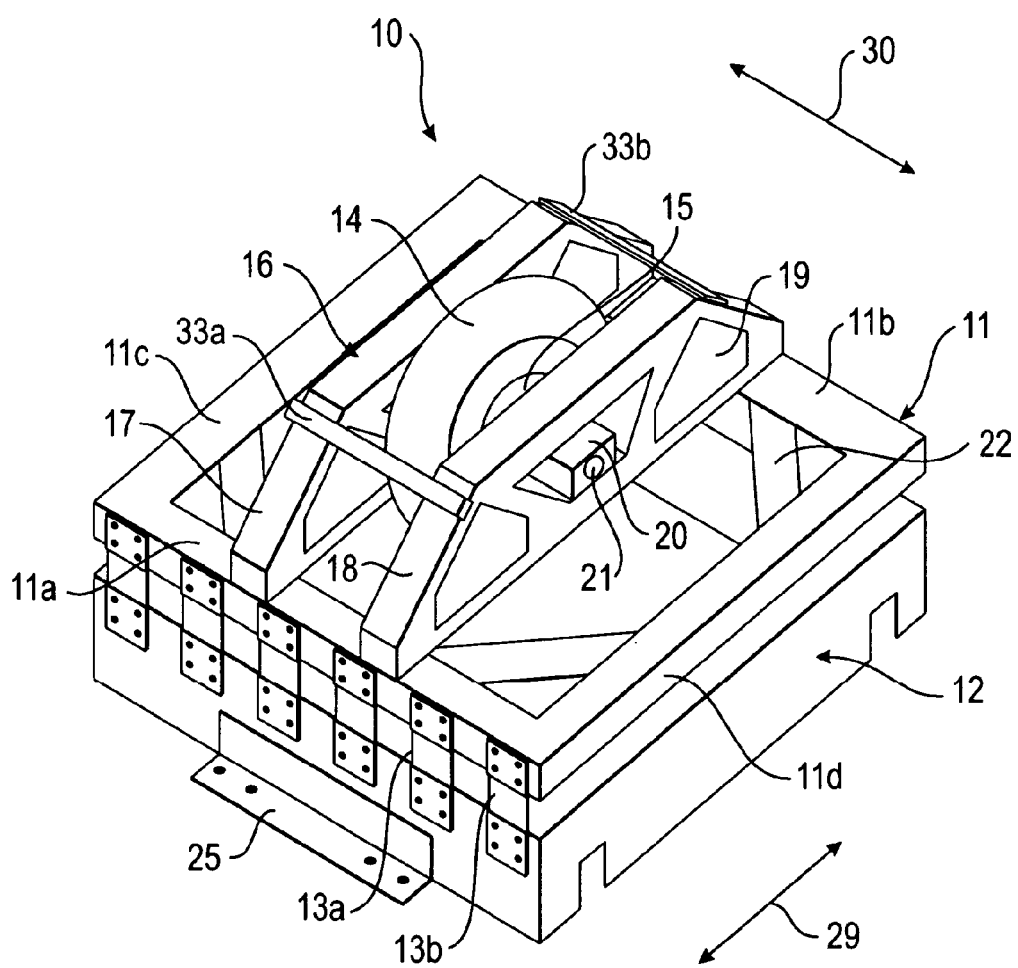
FIG. 1 is a three-dimensional view of an apparatus according to the invention.

FIG. 1 shows an apparatus 10 for non-destructive analysis of natural vibrations of tires. The apparatus 10 which is embodied as a testing bench comprises a stiff frame 11 which has rectangular shape and consists of welded aluminium wrought products. Stiffening struts 22 are provided at the corners of the frame 11.

The frame 11 supports the wheel support 16 supporting a wheel 15 with a tire 14 to be analysed.

The stiff frame 11 is connected with a base part 12 by elastic means which is embodied as a plurality of leaf springs 13a, 13b distanced apart from each other. The leaf springs 13a, 13b are only arranged at the portions 11a, 11b of the frame 11. Thus, the frame 11 is flexibly supported in the predefined functional direction (radial direction) indicated by arrow 29. On the other hand, the frame 11 is not flexible in a lateral direction indicated by arrow 30.

FIG. 4 shows a separate leaf spring 13 as used in the apparatus 10 according to FIG. 1. The leaf spring 13 has a rectangular shape and is connected by means of clamping plates 24 with the frame 11 and the base plate 12 as shown in FIG. 5.

FIGS. 2 and 3 show the detailed construction of the wheel support 16. The wheel support 16 comprises two supporting members 17, 18 which are distanced apart from each other. The two supporting members 17, 18 consist of welded aluminium wrought products. The support members 17, 18 comprise thrust members 19 of essentially triangular shape for taking up thrust forces.

The support members 17, 18 are fastened to the frame 11 by means of a plurality of screws 31 which are fastened into holes 32 provided in the frame 11. Such holes 32 are provided at all portions 11a, 11b, 11c and 11d of the frame 11. Thus, the wheel support 16 can be turned by 90 degrees from the shown position. By turning the wheel support 16, analysis of the natural vibrations can be carried out in the lateral direction. Stiffening struts 33a, 33b fastened to both of the supporting members 17, 18 are provided in order to stabilize the construction. The base plate 12 can be connected to the ground by means of an angle bracket 25.

The supporting members 17, 18 support a shaft 21 comprising a wheel adaptor 23 for fastening the wheel 15. FIG. 3 shows that the shaft 21 is supported in clamping jaws 20 arranged at the ends of the shaft 21. The clamping jaws 20 are fastened to the support members 17, 18. In the closed position the clamping jaws 20 do not permit any rotation of the shaft 21.

There is shown in FIG. 6 that an electrodynamic shaker 26 comprising a stinger 27 is arranged next to the apparatus 10. The stinger 27 is connected with the frame 11 such that vibrations excerted from the shaker 26 are transferred to the frame 11 and the wheel 15. The shaker 26 is elastically suspended by means of elastic suspensions 28. Such a shaker 26 is used for measurements of radial and lateral vibrations.

In the following the function of the apparatus 10 will be described.

In the position shown in FIG. 1 the apparatus 10 permits the analysis of natural vibrations of tires in the radial direction indicated by arrow 29 of FIG. 1. For this purpose the electrodynamic shaker 26 of FIG. 6 is arranged at the portions 11a or 11b of the frame 11, which is not shown in FIG. 1. The stinger 27 connected with the frame 11 excites vibrations in the wheel 15. By means of accelerometers (not shown in the drawings) an input signal x(t) is measured at a contact surface between the tire 14 and the wheel 15. The output signal y(t) is measured by means of further accelerometers at the surface of the tire 14.

The transfer function of the tire H(f) is calculated wherein the transfer function H(f) is defined as:

$$H(f) = \frac{Y(f)}{X(f)}$$

wherein
Y(f) is the output Fourier spectrum
X(f) is the input Fourier spectrum.

This transfer function H(f) characterizes the natural vibrations of the tire.

The transfer function of the tire $H_{tire}$ can be determined in another manner if an increased signal quality is desired. In this case the transfer function of the tire is calculated from the transfer function of the rim $H_{rim}$ and the transfer function of the wheel $H_{wheel}$ as follows:

$$H_{rim} \cdot H_{tire} = H_{wheel} \quad (1)$$

From transforming and describing the measured transfer functions by the auto power spectral density $S_{AA}(f)$ and the cross power spectral density $S_{AB}(f)$ follows:

$$H_{tire} = (H_{rim})^{-1} \cdot H_{wheel} = \left(\frac{S_{Fexc;X}(f)}{S_{Fexc,Fexc}(f)}\right)^{-1} \cdot \frac{S_{Fexc;Y}(f)}{S_{Fexc,Fexc}(f)} \quad (2)$$

Wherein $S_{AA}(f)$ and $S_{AB}(f)$ with the sample signals A and B are defined as follows:

$$S_{AA}(f) = A^*(f) \cdot A(f) \quad (3)$$

$$S_{AB}(f) = A^*(f) \cdot B(f) \quad (4)$$

wherein the star (*) denotes the complex conjugate.

If lateral natural vibrations are to be analysed the wheel support 16 can be turned by 90 degrees and fixed to the holes 32 provided in the frame 11.

For analysing rotational vibrations two shakers are provided each of which is connected with the shaft 21 by means of a lever. Thus, the shaft 21 performs angular oscillations and excites the wheel 15 and the tire 14 fitted thereon.

The apparatus 20 provides a modular design. Thus, the apparatus 10 can be used for the analysis of a broad range of tires.

In the apparatus 10 according to the invention the influencing variables of the natural vibrations of the tire are separated since the frame 11 is flexibly supported in one predefined direction by a plurality of leaf springs 13a, 13b. Since excitation of vibrations is made via the wheel, no superposition with friction effects or modulation due to bending stress will occur.

List of Reference Signs

| | |
|---|---|
| 10 | apparatus |
| 11 | frame |
| 12 | base part |
| 13a, b | leaf spring |
| 14 | tire |
| 15 | wheel |
| 16 | wheel support |
| 17 | supporting member |
| 18 | supporting member |
| 19 | thrust member |
| 20 | clamping jaw |
| 21 | shaft |
| 22 | stiffening strut |
| 23 | wheel adaptor |
| 24 | clamping plate |
| 25 | angle bracket |
| 26 | shaker |
| 27 | stinger |
| 28 | elastic suspension |
| 29 | arrow |
| 30 | arrow |
| 31 | screw |
| 32 | hole |
| 33 | strut |

The invention claimed is:

1. A method for non-destructive analysis of natural vibrations of a tire comprising the steps:
    fitting a tire to be analysed on a wheel;
    arranging said wheel in an apparatus comprising a wheel support supporting said wheel, wherein said wheel support is adjustably fastened to a stiff frame flexibly connected to a base part by elastic means such that separate analysis of the natural vibrations in a predefined functional direction is allowed;
    excitation of vibrations in the predefined functional direction in said wheel by means of an actuator;
    measuring an input signal at a contact surface between said tire and said wheel;
    measuring an output signal at a surface of said tire; and
    calculating transfer function of said tire by means of the input signal and the output signal.

2. The method as claimed in claim 1, wherein said analysis is carried out with and without load on said tire.

3. The method as claimed in claim 1, wherein said excitation is introduced in a center of gravity of said wheel.

4. The method as claimed in claim 1, wherein said output signal is formed by the vibration of the complete tire structure of the tire surface.

5. An apparatus for non-destructive analysis of natural vibrations of a tire, comprising:
    a stiff frame comprising a wheel support for supporting a wheel with a tire to be analysed, said wheel support being adjustably fastened to a stiff frame;
    a base part flexibly connected with said frame by elastic means, said elastic means being embodied such that the frame is flexibly supported in one predefined functional direction; and
    an actuator for exciting vibrations into said wheel.

6. The apparatus according to claim 5, wherein said elastic means comprises a plurality of leaf springs distanced apart from each other.

7. The apparatus according to claim 6, wherein stiffness of said leaf springs is dimensioned such that a frequency of resonance in a direction of excitation lies below a desired frequency of excitation of said tire.

8. The apparatus according to claim 7, wherein the stiffness of said frame and of said leaf springs in a transverse direction is dimensioned such that the frequency of resonance is above the desired frequency of excitation of said tire.

9. The apparatus according to claim 5, wherein said frame comprises welded aluminium wrought products.

10. The apparatus according to claim 5, wherein said wheel support comprises two supporting members distanced apart from each other, said supporting members supporting a shaft for mounting said wheel.

11. The apparatus according to claim 10, wherein a wheel adapter is connected to said shaft.

12. The apparatus according to claim 10, wherein said shaft is supported in clamping jaws arranged at ends of said shaft.

13. The apparatus according to claim 5, wherein said wheel support comprises at least one thrust member for taking up thrust forces.

14. The apparatus according to claim 5, wherein said actuator is a hydraulic, electrodynamic, electromagnetic or piezoelectric actuator.

15. The apparatus according to claim 5, wherein said actuator is an electrodynamic shaker comprising a stinger connected to said frame.

16. The apparatus according to claim 5, wherein said actuator for introducing rotational vibrations comprises at least one shaker which is connected to a lever fastened to said shaft.

17. The apparatus according to claim 5, wherein said actuator is elastically suspended.

* * * * *